United States Patent
Thornton et al.

(10) Patent No.: US 10,951,027 B2
(45) Date of Patent: Mar. 16, 2021

(54) SMART LOAD CENTER PANEL

(71) Applicant: Koolbridge Solar, Inc., Wrightsville Beach, NC (US)

(72) Inventors: Curtis W. Thornton, Pittsboro, NC (US); Paul Wilkinson Dent, Pittsboro, NC (US)

(73) Assignee: Koolbridge Solar, Inc., Wrightsville Beach, NC (US)

( * ) Notice: Subject to any disclaimer, the term of this patent is extended or adjusted under 35 U.S.C. 154(b) by 77 days.

(21) Appl. No.: 16/332,658

(22) PCT Filed: Sep. 12, 2017

(86) PCT No.: PCT/US2017/051046
§ 371 (c)(1),
(2) Date: Mar. 12, 2019

(87) PCT Pub. No.: WO2018/049361
PCT Pub. Date: Mar. 15, 2018

(65) Prior Publication Data
US 2020/0136385 A1    Apr. 30, 2020

Related U.S. Application Data

(60) Provisional application No. 62/393,257, filed on Sep. 12, 2016.

(51) Int. Cl.
*H02J 3/00*     (2006.01)
*H02B 1/22*     (2006.01)
*H02B 1/32*     (2006.01)

(52) U.S. Cl.
CPC ............... *H02J 3/00* (2013.01); *H02B 1/22* (2013.01); *H02B 1/32* (2013.01); *H02J 2300/24* (2020.01)

(58) Field of Classification Search
CPC .......... H02J 3/00; H02J 2300/24; H02B 1/22; H02B 1/32
(Continued)

(56) References Cited

U.S. PATENT DOCUMENTS 5,166,861 A * 11/1992 Krom ................. H02B 1/056
361/678
7,692,332 B2    4/2010 Nordman et al.
(Continued)

OTHER PUBLICATIONS

Koolbridge Solar, Inc., "Smart Load Center", Website capture, Aug. 24, 2016, pp. 1-3, retrieved on Oct. 31, 2017 from internet https://web.archive.org/web/20160824015411/http://koolbridgesolar.com:80/smart-load-center/.

*Primary Examiner* — Hal Kaplan
(74) *Attorney, Agent, or Firm* — Coats & Bennett, PLLC

(57) ABSTRACT

A smart load center panel (10) accepts two hot legs from each of two power sources, and selectively connects each of a plurality of breakers to one of the two power sources under processor control. A dielectric chassis (12) provides structural support and electrical isolation for a plurality of individual circuit boards (28), each including a pair of breaker stabs (26) and a relay (24) operative to selectively connect each breaker stab (26) to a different power source. A bus bar assembly (20) comprises two bus bars for the hot legs of each of two power sources, and insulates the bus bars from each other and from inadvertent contact. A master printed circuit board (40) comprises slits (43, 45) defining the individual circuit board (28) except at the edges. After mounting and soldering, the edges are cut away, yielding a plurality of individual circuit boards (28). Neutral and ground bus bars (46, 52) are mounted to the side of the panel housing (12), behind a flange of a front opening.

26 Claims, 10 Drawing Sheets

(58) Field of Classification Search
USPC .......................................................... 307/19
See application file for complete search history.

(56) References Cited

U.S. PATENT DOCUMENTS

| | | |
|---|---|---|
| 9,035,782 B1 | 5/2015 | Flegel |
| 9,281,715 B2 | 3/2016 | Lim et al. |
| 9,509,139 B1 | 11/2016 | Flegel |
| 2010/0319958 A1 | 12/2010 | Latimer |
| 2013/0070394 A1 | 3/2013 | Batzler et al. |
| 2014/0084687 A1 | 3/2014 | Dent |

\* cited by examiner ately between the bars A and B. Each 120V circuit connects to a single breaker, which clips onto one breaker stab, connecting to 120V on either L1 or L2. A (black) wire from the breaker is then routed out of the box, and to a series of loads (light switches, electrical outlets, and the like). A (white) neutral wire, and in most modern installations a (green or bare) ground wire return from the load(s) to the panel. The return and ground wires are each connected to a separate bus, typically located to the sides of the breaker bars, as shown in FIG. 1. Note that, because the breaker stabs are close to the centerline of the panel, there is ample space between the neutral/ground buses and the panel sides, to facilitate the routing of a plurality of wires.

SMART LOAD CENTER PANEL

RELATED APPLICATIONS

This application claims priority to U.S. Provisional Patent Application Ser. No. 62/393,257, titled "Smart Load Center Panel," filed 12 Sep. 2016, the disclosure of which is incorporated herein by reference in its entirety.

TECHNICAL FIELD

The present invention relates generally to electrical wiring, and in particular to a "smart load center" panel dynamically switching power individually, on a per-circuit basis, to a plurality of circuit breakers, from either of two power sources, such as grid power and an inverter powered by solar panels (or by a battery charged by solar panels).

BACKGROUND

In the face of global climate change, generally attributed to the burning of fossil fuels, there is a large interest in renewable power sources, such as solar. Global demand has driven the cost of photovoltaic (PV) panels consistently lower—a drop of over 70% in the decade since 2006. Lower costs, together with incentives such as the Solar Investment Tax Credit, have contributed to a sharp rise in the installation of both residential and commercial solar power facilities. The U.S. achieved 1 million solar installations in 2016, generating over 29 GW of electricity.

One challenge inhibiting the growth of "local" solar power—i.e., residences and buildings, as opposed to power generation farms—is the integration of solar power with "grid" power from a utility. Rarely can a facility go completely off-grid. Solar power availability is obviously dependent on the weather. Additionally, many PV installations cannot drive high demand appliances, such as a well pump, water heater, or clothes dryer. Accordingly, many solar installations are only used to power a subset of the circuits in a building. However, when grid power is temporarily unavailable, such as following a hurricane or ice storm, it is advantageous to utilize the solar power more extensively.

Furthermore, many utilities tie power pricing to demand—charging higher rates during peak usage hours in an attempt to balance usage. In these cases, it is advantageous to be able to switch circuits between solar and grid power based on the utility's pricing model (which is often tied to the time of day).

In a typical residential electrical installation, power is derived from a 240V transformer with a center tapped secondary. The transformer is connected to one phase of the (typically) 3-phase AC grid power. The center tap of the transformer is neutral (white wire), and two "hot" legs L1 (black) and L2 (red), tapped at either end of the transformer secondary winding, each carry a potential of 120V referenced to the neutral, 180° out of phase with each other. Across the hot legs—L1 to L2—is 240V. A ground (green or bare copper wire) is connected to the neutral only at the service drop. This is known as a 3-wire, single-phase, mid-point neutral system, also referred to as split-phase (and often erroneously called 2-phase).

FIG. 1 depicts a typical, grid-powered breaker panel, with the breakers removed to show the bus bars. The vertical bus bars (A and B in FIG. 1) are each connected to a different hot leg—e.g., L1=A and L2=B. Tabs, known as breaker stabs, protrude altern The slots for each breaker are numbered, with odd numbers on one side and even on the other. For example, a 16-breaker panel may be arranged as:

1 A 2
3 B 4
5 A 6
7 B 8
9 A 10
11 B 12
13 A 14
15 B 16

In this example, circuits 1 and 2 will be on leg A (L1), circuits 3 and 4 on leg B (L2), and so on down the panel.

For 240V circuits, a double pole breaker spans two slots on one side, and connects to two adjacent breaker stabs. Since the A/L1 and B/L2 stabs alternate, in any position, the double breaker connects between L1 and L2, for 240V.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, novel and nonobvious mechanical aspects of a smart load center panel facilitate the dynamic, programmable provision of power from two different sources on a per-circuit basis. The smart load center includes a processor, which controls a relay interposed between each breaker and the hot legs of two (or more) power sources. By switching each relay independently between, e.g., grid power and solar power, each circuit of a building may be dynamically driven by either power source.

Numerous aspects of the construction of the inventive smart load center panel provide advantages in this application. These include:

A dielectric chassis insulates components from the panel housing, and defines slots for holding and electrically isolating individual circuit boards, breakers, and other components;

a bus bar assembly provides connectivity to hot legs of two (or more) different power sources, while insulating the legs from inadvertent contact;

provisioning breaker stabs on individual circuit boards facilitates interposing a relay between each breaker stab and two (or more) sources of power; the circuit boards may additionally contain other electrical components;

electrical isolation between circuits is improved by the air gap resulting from locating breaker stabs on separate circuit boards, and by walls of the chassis physically isolating the circuit boards;

placement, mounting, and soldering of the individual circuit boards is facilitated by fabricating a master printed circuit board with spaces formed therein but held together by the edges, then cutting away the edges after assembly and soldering to define individual circuit boards;

in some embodiments, uneven spacing of the individual circuit boards along the bus bar assembly restricts the placement of double-pole, 240V breakers to predefined pairs of circuits;

mounting neutral and ground buses along the side of the panel utilizes space that is wasted in prior art panels;

the provision of LEDs provides visual indication of the status and/or power source connected to each breaker; and the provision of push buttons and a display facility user interaction with the microprocessor controlling the smart load center.

One embodiment relates to a smart load center panel operative to dynamically distribute power from two sources selectively and individually to a plurality of circuits. The panel includes a housing operative to fit in a wood frame construction wall and having a back wall and four side walls; a dielectric chassis defining a plurality of cross channels and a central longitudinal channel, the chassis secured to the back wall of the housing; a bus bar assembly disposed in the longitudinal channel and comprising a plurality of bus bars, each connected to one power leg of each power source, and a dielectric sheath insulating the bus bars from each other and from inadvertent contact; and a plurality of individual circuit boards, each electrically connected to a bus bar carrying a corresponding power leg of each power source, and having at least one breaker stab and a relay installed thereon, the relay operative to selectively electrically connect the breaker stab to one of the two power sources under the control of a processor.

Another embodiment relates to method of fabricating and mounting a plurality of individual circuit boards in a smart load center panel operative to dynamically distribute power from two sources selectively and individually to a plurality of circuits and comprising a housing operative to fit in a wood frame construction wall and having a back wall and four side walls; a dielectric chassis defining a plurality of cross channels and a central longitudinal channel, the chassis secured to the back wall of the housing; a bus bar assembly disposed in the longitudinal channel and comprising a plurality of bus bars, each connected to one power leg of each power source, and a dielectric sheath insulating the bus bars from each other and from inadvertent contact. A master printed circuit board (PCB) is fabricated, the PCB having a longitudinal axis and including a plurality of slits formed transverse to the longitudinal axis. The slits extend through the center of the PCB but not to the edges thereof. All conductive paths, vias, and mounting holes for each of the plurality of individual circuit boards are located between slits. The master PCB is mounted to the chassis. After mounting the master PCB to the chassis, the master PCB is cut in a longitudinal direction near each edge thereof but inwardly of the furthest extent of the plurality of slits, thereby resulting in the plurality of individual circuit boards being mounted to the chassis in a spaced apart relationship. At least one breaker stab and relay are installed on each individual circuit board. The relay is operative to selectively electrically connect the breaker stab to one of the two power sources under the control of a processor.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Embodiments of the present invention are directed generally to mechanical or physical aspects of a panel, or breaker box, for residential or commercial buildings, which provides flexibility in connecting any 120V circuit to one phase, or hot leg, of either of two (or more) power sources. Similarly, 240V circuits may connect across the hot legs of either of the two (or more) power sources. For ease of explanation, embodiments of the present invention are described herein as having two power sources—which are referred to herein as grid power (G) and solar power (S). However, the invention is not limited by either the number of power sources or the means from which power is derived. The inventive concepts disclosed herein may easily be applied by those of skill in the art, given the teaching of the present disclosure, to a panel distributing power from three, four, or more different power sources. Furthermore, those sources may derive from any mix of an electricity grid provided by a utility, solar, wind, thermal, atmospheric, battery, or other power generated and/or stored locally.

To place embodiments of the present invention in context, the electrical functionality of the smart load center panel is briefly described. Two 120 VAC hot legs from each of two power sources enter the panel. A relay is electrically interposed between a hot leg from each power source and each breaker stab. The relays are controlled by a microprocessor. Under program control, each breaker stab is dynamically connected to the hot leg of either grid power or solar power. In this manner, more circuits of a building may be powered by solar when the sun is shining and the solar panels are delivering full power; and circuits may be automatically switched to grid power at night or on cloudy days. Furthermore, circuits may be switched between grid and solar power at different times, for example to take advantage of lower rates for the grid power during non-peak demand times. Program control allows users to define priorities when power is limited—for example, if grid power goes down due to a weather event, the user may keep a freezer powered at all times on solar, with circuits for lighting or entertainment shut down when the solar system output fades at night or due to cloud cover.

Figure 2:
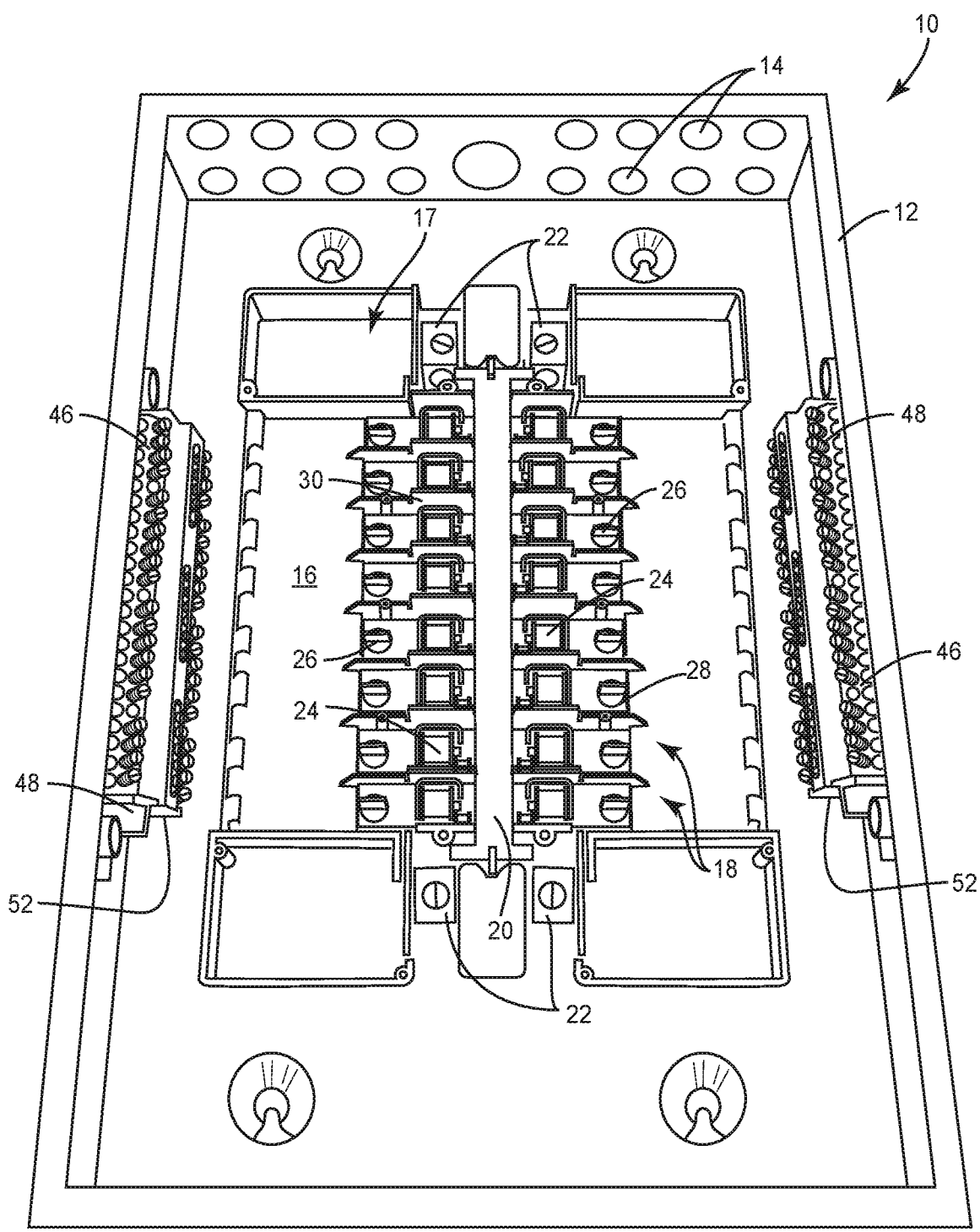
FIG. 2 is a view depicting some components of a smart load center panel.

FIG. 2 is a photograph of portions of a smart load center panel 10, according to various embodiments of the present invention. The panel 10 includes a conventional housing 12. The housing 12 is preferably 14.4 inches or less in width, and 3.5 inches or less in depth, so as to fit between studs in conventional wood frame construction having studs with 16-inch spacing. As known in the art, various openings 14 in the housing 12 are pre-scored or pre-punched, allowing for easy knock-out on site to run electrical wires into and out of the housing 12.

Figure 3:
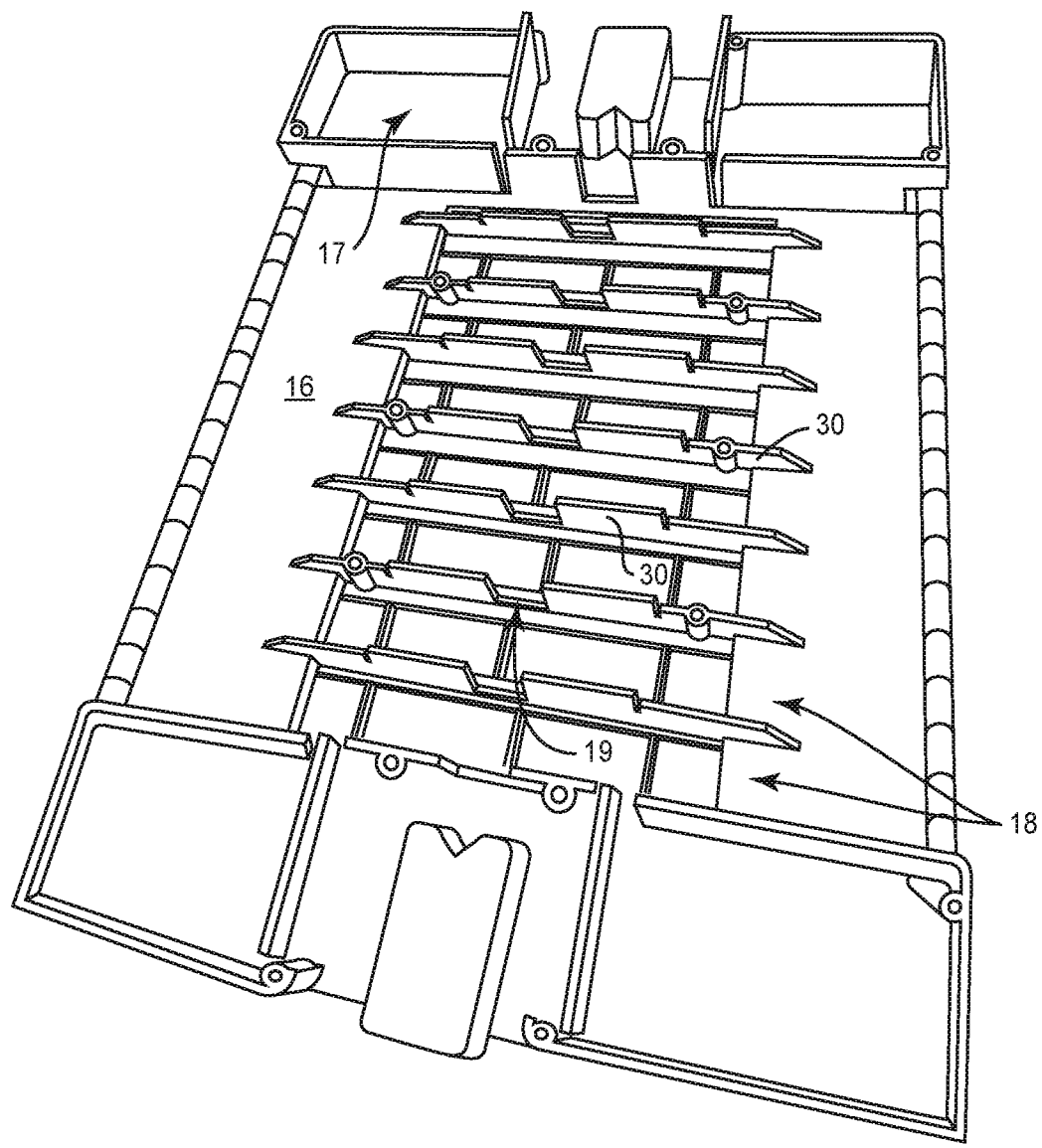
FIG. 3 is a view of a chassis.
Figure 4:
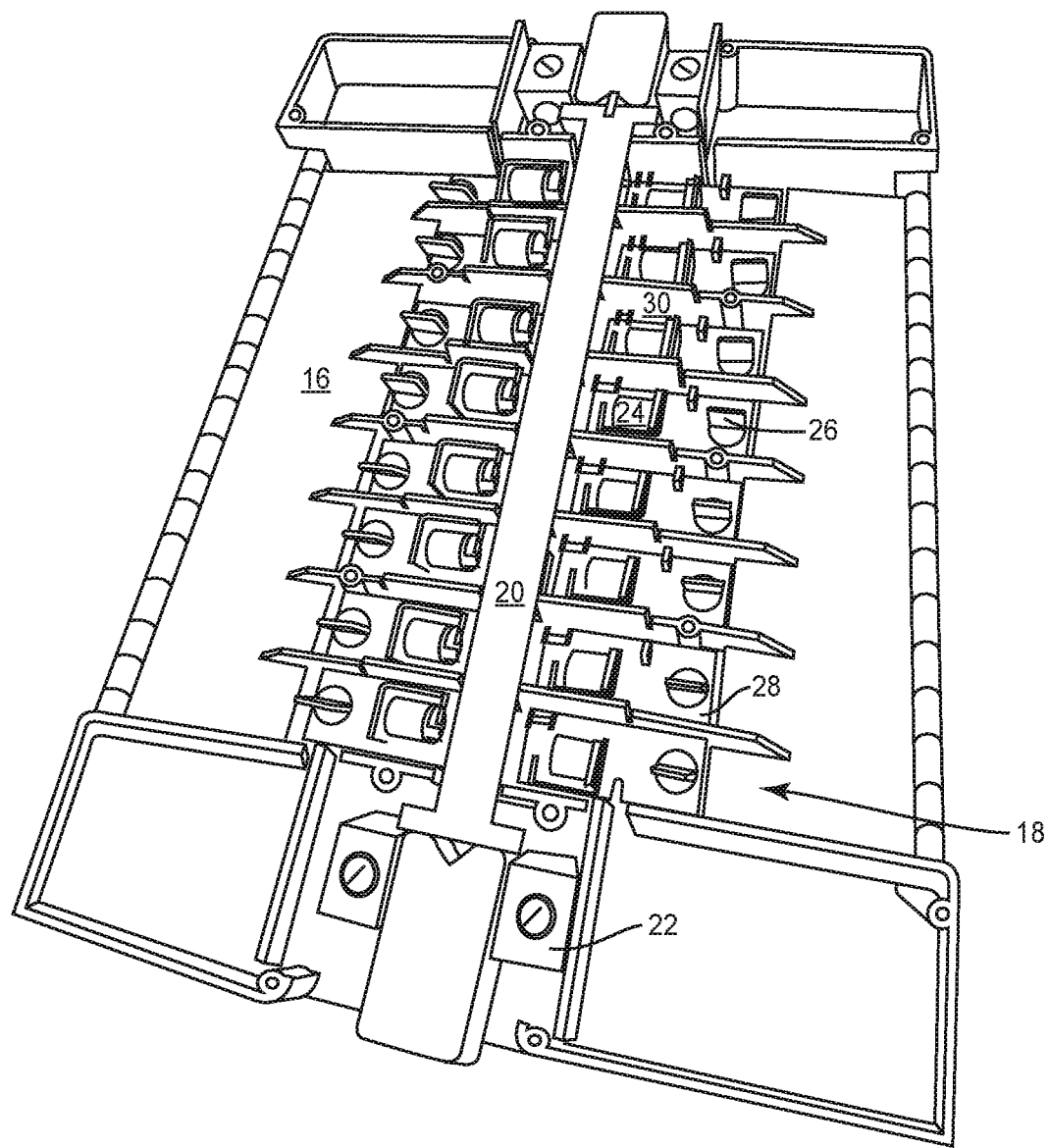
FIG. 4 is a view of the chassis populated with a bus bar assembly and individual circuit boards including relays and breaker stabs.

A dielectric chassis 16, formed for example of plastic or the like, is disposed within the housing 12 and affixed to the back wall thereof. FIG. 3 depicts an enlarged view of the chassis 16 alone, and FIG. 4 depicts the chassis 16 with a various components installed, as more fully explained herein. The chassis 16 includes a plurality of pairs of ribs 30. Each rib 30 of a pair are co-linear, with a space between the pair in the center. The pairs of ribs 30 define define cross channels 18 formed along either side of the chassis 16. The cross channels 18 are sized and shaped to receive and hold conventional circuit breakers. A central channel 19 is formed vertically, or along a central longitudinal axis of the chassis 16, by the spacing between pairs of ribs 30. As more fully explained herein, a bus bar assembly 20 is disposed in the central channel 19. Four power lugs 22 (FIG. 4)—two at either end of the bus bar assembly 20—receive and secure the four hot power wires (i.e., L1G, L2G, L1S, and L2S, where G denotes grid and S denotes solar), which may be, e.g., 3 or 4 gauge wires. Each power lug 22 connects electrically to one bus bar in the bus bar assembly 20 when the assembly 20 is inserted into the chassis 16. Rectangular compartments 17 are also formed in the chassis 16. The compartments 17 may receive, e.g., a power supply or other electro-mechanical component, as required or desired. As one example, a communication module—such as wire-line communications, wireless communications, or the like—could occupy a compartment 17.

Unlike conventional breaker panels, where the bus bars directly connect to breaker stabs, in the smart load center panel 10, electrical connection between the power bus bars and each breaker stab is routed through a relay 24. The relays 24, as well as the breaker stabs 26, are mounted, in pairs, on independent circuit boards 28. The circuit boards may comprise conventional Printed Circuit Board (PCB) construction. Each circuit board 28 spans the center of the chassis 16, and extends to either side of the bus bar assembly 20. The ribs 30 formed in the chassis 16 physically and electrically separate each circuit board 28. One advantage of locating breaker stabs 26 on individual circuit boards is superior electrical isolation. For example, UL guidelines require 1.25 inches of separation, along a surface, between terminals powered to 120V; however, this distance requirement drops to 0.75 inches if there is an intervening air gap between the terminals. Another advantage of the use of circuit boards 28 is that additional components may easily be incorporated. For example, in one embodiment, a current sensor, such as a Hall effect sensor, may be interposed between the relay 24 and the breaker stab 26, to monitor the current being delivered to the attached circuit.

In one embodiment, the bus bar assembly 20 comprises four bus bars, each formed of a conductive material (e.g., copper), that are housed in a dielectric sheath (e.g., plastic). The dielectric material insulates the bus bars from each other and from external contact. This insulation provides a major advance in safety over conventional breaker panels (e.g., FIG. 1), in which the entire bus bars are exposed and the risk of inadvertent contact is manifest whenever a breaker is removed. In one embodiment, the bus bars are arranged in an order that places corresponding hot legs from the two different sources adjacent, for example: L2G-L2S-L1G-L1S. Vias in the sheath, optionally with stubs pre-affixed through them, provide connectivity to the bus bars at predetermined, staggered spacing along the length of the bus bar assembly.

Figure 5:
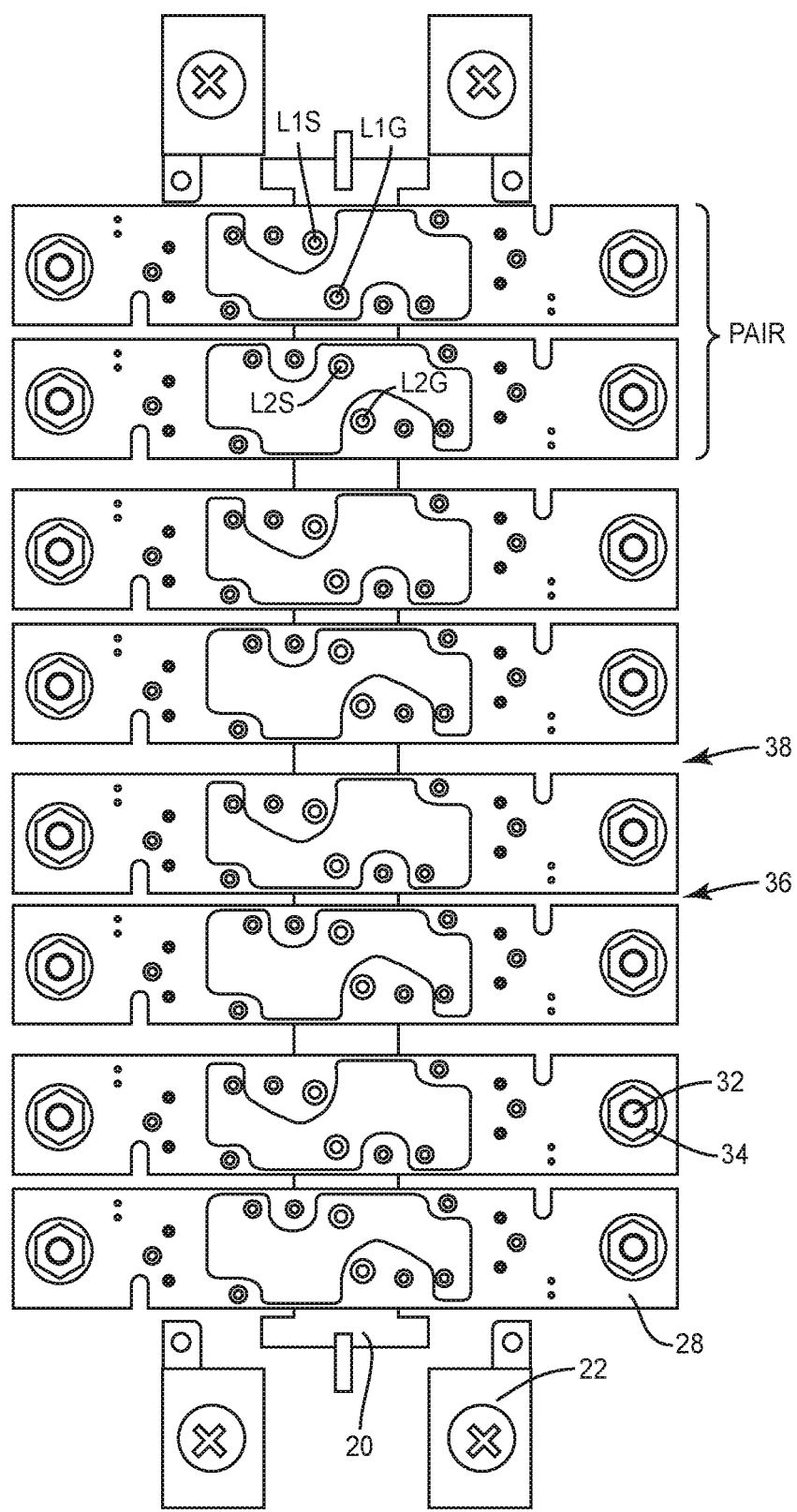
FIG. 5 is a view of the back side individual circuit boards connected to the bus bar assembly.

FIG. 5 depicts the circuit boards 28 and bus bar assembly 20 from the back. Threaded posts 32 and corresponding nuts 34 secure the breaker stabs 26 on the other side of the circuit boards 28. In one embodiment, the circuit boards 28 are spaced along the length of the bus bar assembly 20 in pairs—with a relatively narrow space 36 separating the two circuit boards 28 of each pair, and relatively wide spaces 38 separating the pairs of circuit boards 28. One circuit board 28 of each pair connects to a corresponding hot leg of both power sources, and the other circuit board 28 of each pair connects to the other hot leg of both sources. For example, consider the top pair of circuit boards 28. Assuming the bus bar configuration of the example presented above (L2G-L2S-L1G-L1S, as viewed from the front), the upper circuit board 28 of the upper pair connects to both L1S and L1G, as indicated in FIG. 5. The lower circuit board 28 of the upper pair connects to both L2S and L2G, as indicated. For a given power source, this connectivity results in alternating hot legs providing power to left-right pairs of circuit breakers along the height of the panel 10, as in the prior art. That is, for circuits numbered as described above in the Background section, circuits 1 and 2 are powered by L1, circuits 3 and 4 by L2, circuits 5 and 6 by L1, and so on. The dynamic source switching feature of the smart load center panel 10 presents the additional variable that the source of power may be dynamically switched between grid and solar, by control of the relay 24 by a processor.

However, in this embodiment, the uneven spacing 36, 38 that groups the circuit boards 28 into pairs restricts the placement of double-pole breakers for 240V circuits. These can only be connected across both breaker stabs (on either side) of a pair of circuit boards 28. In some embodiments, this restriction may simplify programming, as grid/solar power source selection need only be tied together for defined pairs of circuit boards 28. In other embodiments, the restriction may have additional advantages, such as minimizing the number of components (e.g., relay drivers) having a limited number of outputs, by limiting the number of possible locations of double-pole breakers. In other embodiments, the circuit boards 28 may be spaced evenly along the bus bar assembly 20, allowing double-pole breakers for 240V circuits to be connected across any two circuit boards 28. Note that the alternating hot leg configuration described above ensures that, in an evenly-spaced embodiment, any placement of a double-pole breaker for a 240V circuit will result in an L1-L2 connection (and software should ensure that both hot legs derive from the same source: grid or solar).

Figure 6:
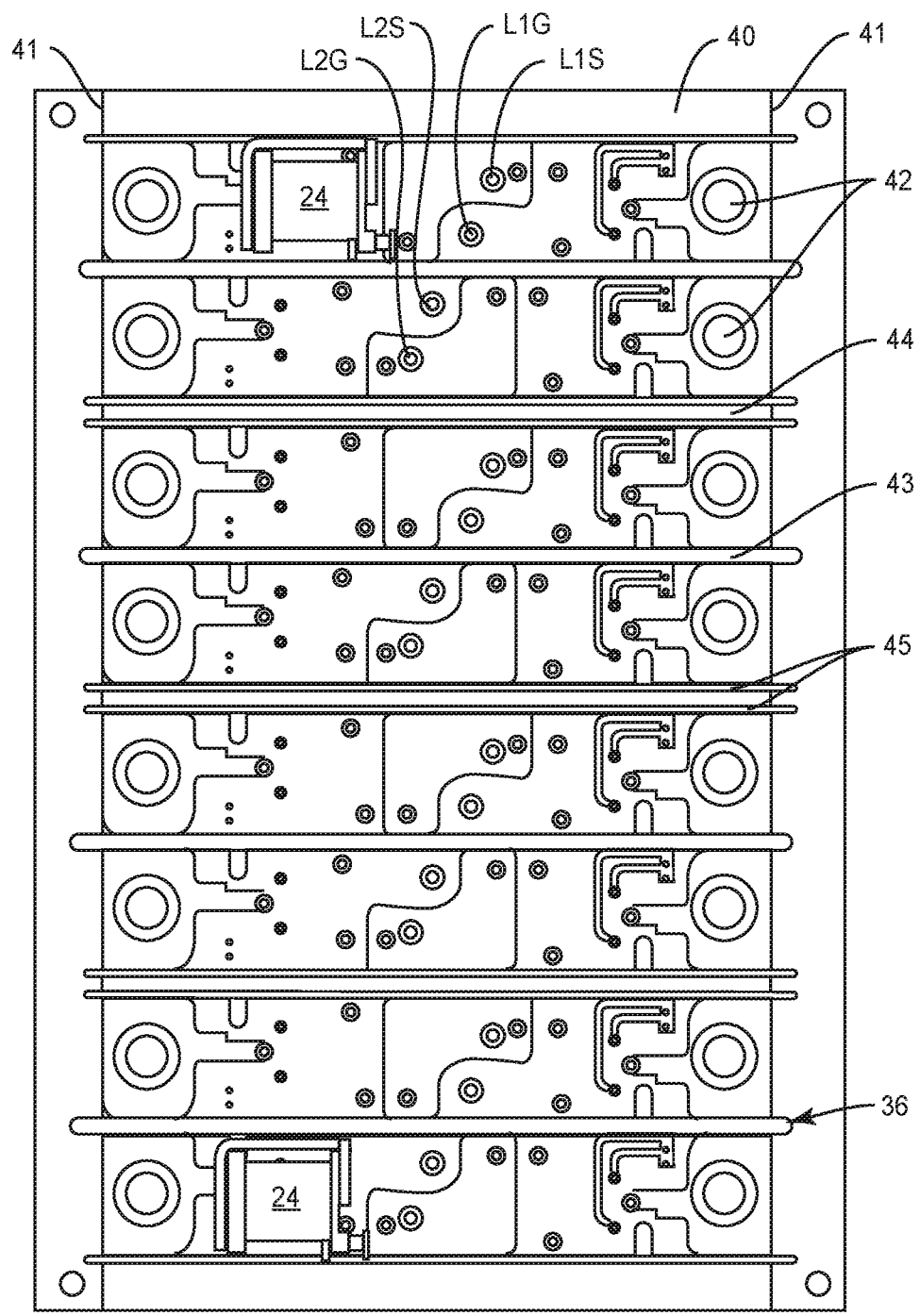
FIG. 6 is a view of a master circuit board prior to cutting it to yield multiple individual circuit boards.

FIG. 6 depicts a master PCB 40, on which two relays are mounted for reference. Individual circuit boards 28 are formed by cutting the master PCB 40 along the scored lines 41 to either side. In one embodiment, the master PCB 40 is attached to the chassis 16 and bus bar assembly 20, and the connections soldered, prior to cutting the lines 41. This ensures that all of the vias are aligned, without the need to align and solder each circuit board 28 individually.

Holes 42 are formed in the PCB 40 for the attachment of breaker stabs 26. Staggered vias at the centers of the circuit boards 28 connect to the hot bus bars as indicated in FIGS. 5 and 6. Various other vias are for accepting connector pins of the relays 24, and pins for individual electrical connectors to a processor board (marked on the PCB 40 as "1 2" and "2 1" in FIG. 6).

In the embodiment where the circuit boards 28 are grouped into pairs by spacing, the intra-pair spacing 36 is formed as a slit 43 in the master PCB 40. The inter-pair spaces 38 are defined by smaller slits 45 defining a thin strip 44 of PCB material, with no electrical traces through it. The inter-pair spaces 38 will be formed when the sides of the master PCB 40 are cut along the scored lines 41, and the PCB strips 44 fall away to form the spaces 38.

Figure 1:
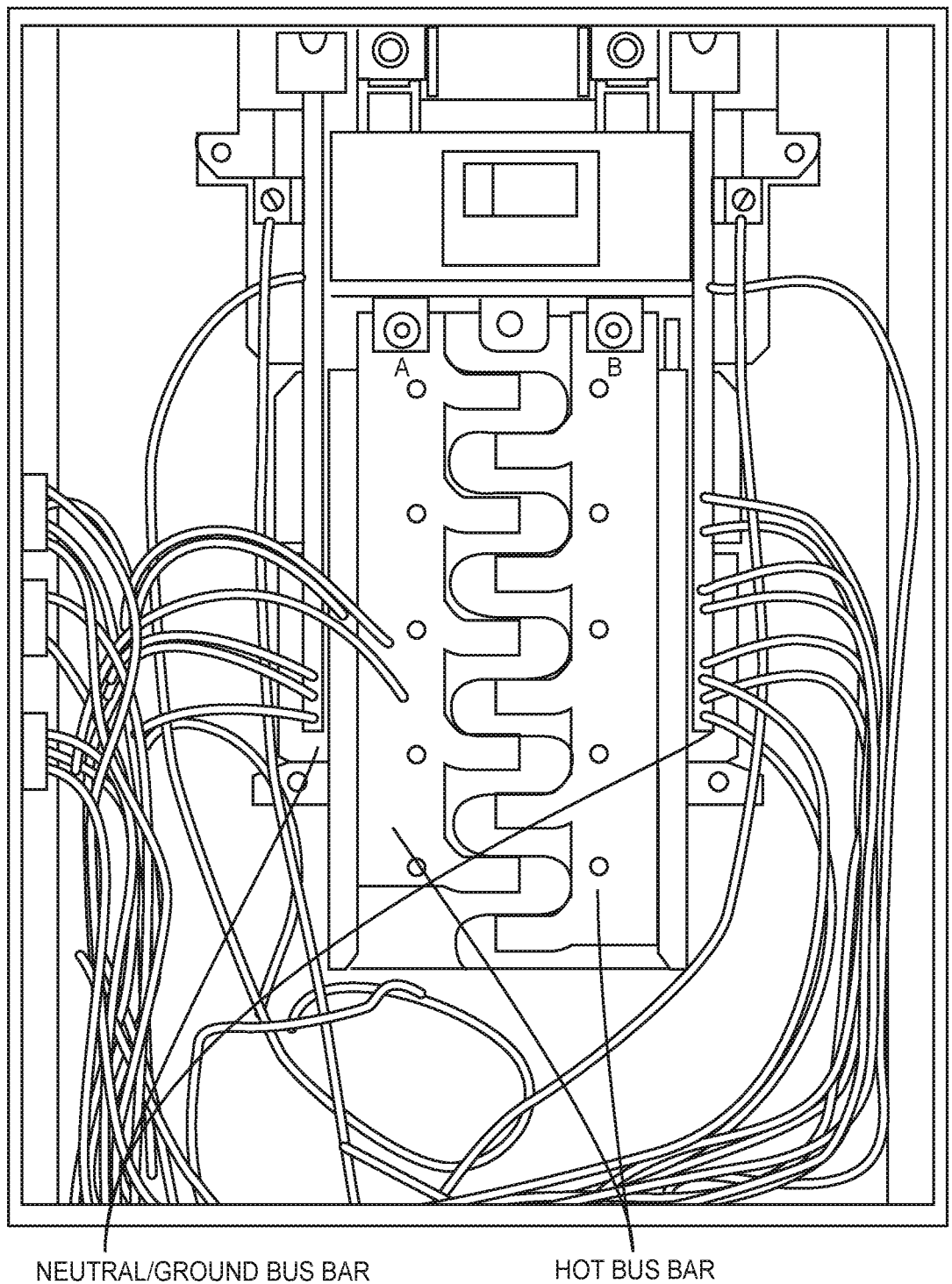
FIG. 1 is view of a typical prior art breaker panel.

Because of the central location of the bus bar assembly 20, and the relays 24 interposed between the bus bar assembly 20 and each breaker stab 26, the breakers, when installed, will extend to the sides of the housing 12 to a far greater degree than is the case in typical prior art panels (see, e.g., FIG. 1). By code, the front cover of the housing 12, which includes a door to access the breakers, must have a minimum ½ inch flange. The space behind this flange is conventionally wasted, as neutral and ground bus bars are typically located outside the breakers, well toward the center of the panel, as depicted in FIG. 1.

Figure 7:
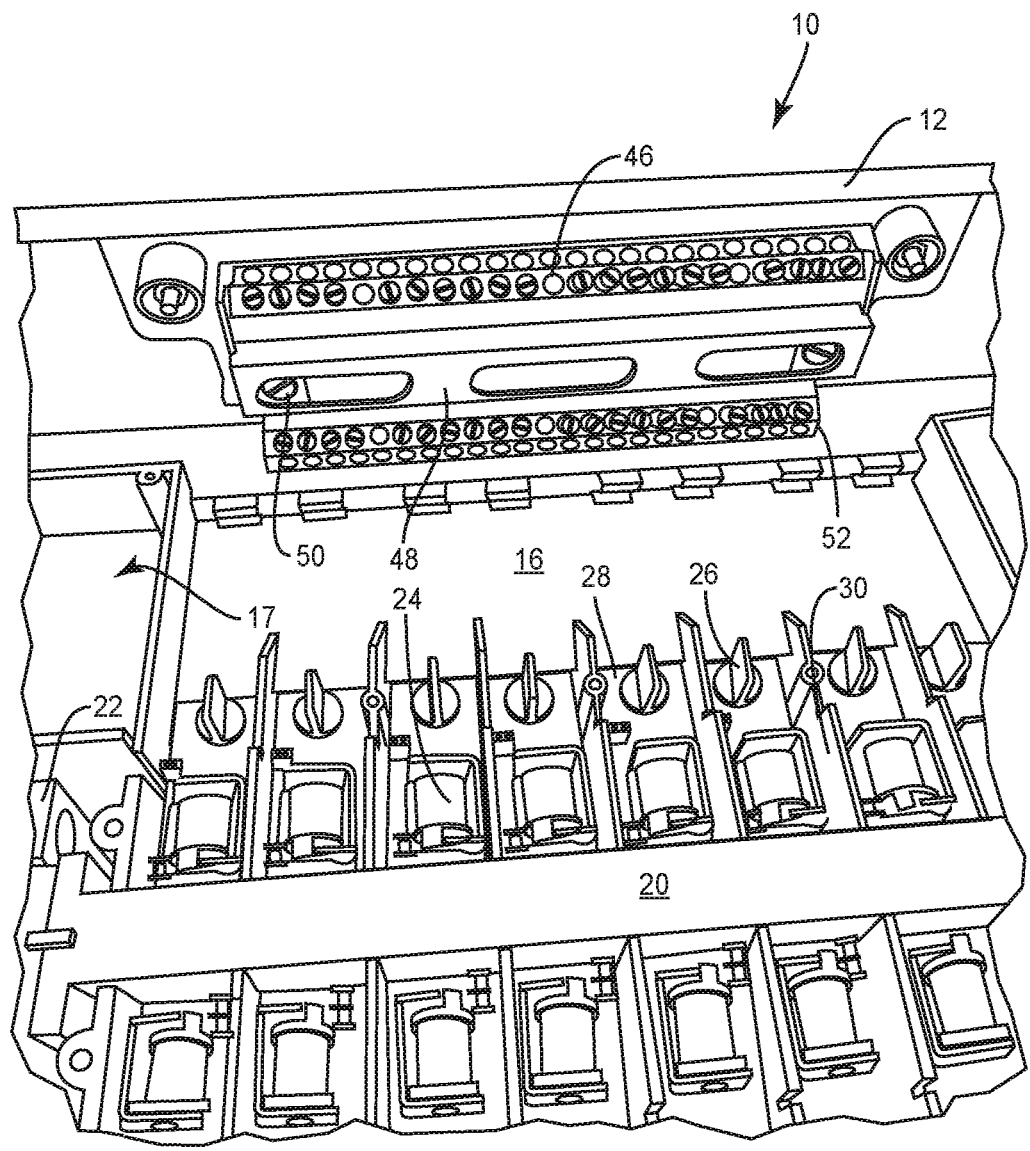
FIG. 7 is a view the smart load center panel depicting neutral and ground buses affixed to one side.

FIG. 7 depicts a neutral bus 46 mounted to the side of the housing 12 with an intervening dielectric mounting block 48. The neutral bus 46 comprises a conductive bar with a plurality of holes to accept, e.g., 12-14 gauge wires, each held with a set screw. In one embodiment, neutral wires from all circuits—whether grid or solar power is connected to the respective breakers—are connected to the neutral bus 46. Note that in this embodiment, the neutral of one power source (e.g., solar) does not ground its own neutral line, but rather connects its neutral to the neutral of the other power source (e.g., grid) within the panel 10, and thus grounds its neutral line at this point. The reason for this is that, by code, there can be only one point at which neutral is connected to ground—at the service entrance in the case of grid power. In embodiments where the other power source (e.g., solar) grounds its own neutral at the point of power generation, then both hot power and neutral must be switched for each circuit, as the neutral of the solar may never connect to the neutral of the grid power (doing so would result in neutral connecting to ground at more than one point, causing some neutral current to flow through an indeterminate ground path, presenting a shock and/or ground wire overheating hazard). Power lugs 50 accept, e.g., 4 gauge wires that carry the combined neutral current from both power sources to the main panel, where it connects to earth ground.

A ground bar 52 is mechanically and electrically connected to the housing 12. Additionally, a wire connects the ground bars 52 on opposite sides of the housing 12.

In one embodiment, the set screws that secure wires in the bars 46, 52 are angled, e.g. at 45°, to facilitate installation. The neutral and ground wires will typically be connected before the front panel is affixed to the housing 12. By locating the neutral and ground bus bars 46, 52 on the side of the housing 12, the space behind the flange of the panel cover is more fully utilized than in prior art panels.

Figure 8:
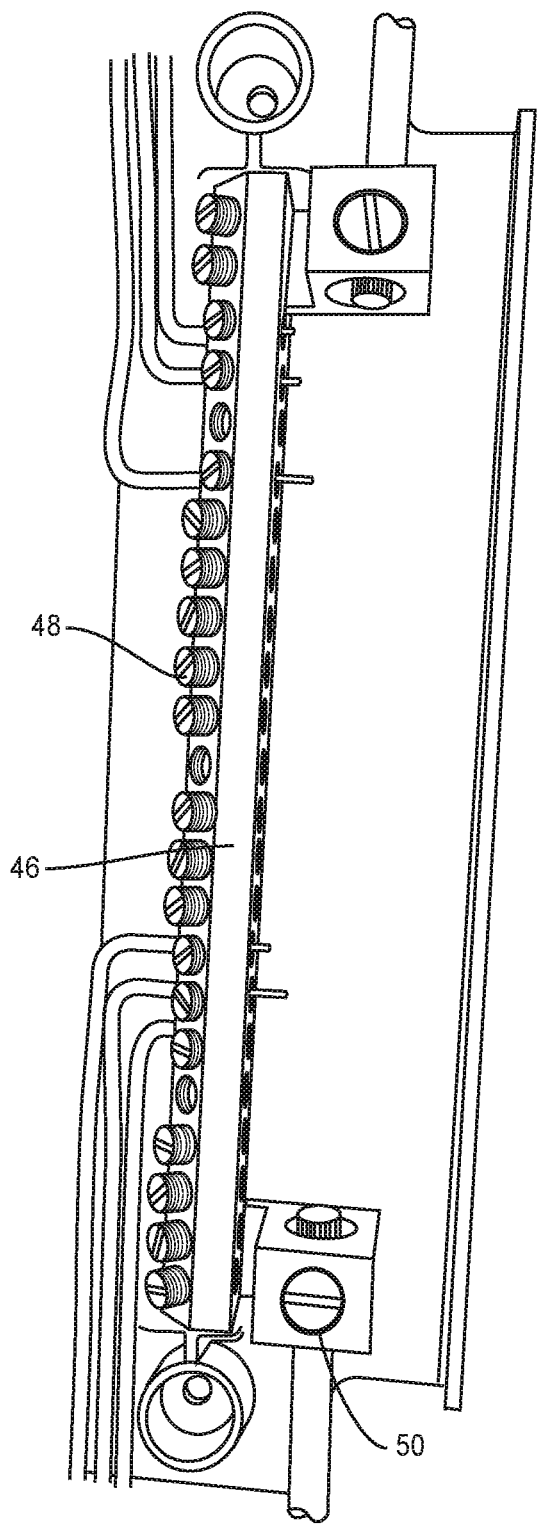
FIG. 8 is a view a neutral bus with neutral wires attached.

FIG. 8 depicts the attachment of neutral wires to the neutral bar 46. By routing the wires as shown, at least eight 12-14 gage wires may be connected in each direction, within the height constraint of the housing 12. Another neutral bar 46 and ground bar 52 are connected at the other side of the housing 12.

Figure 9:
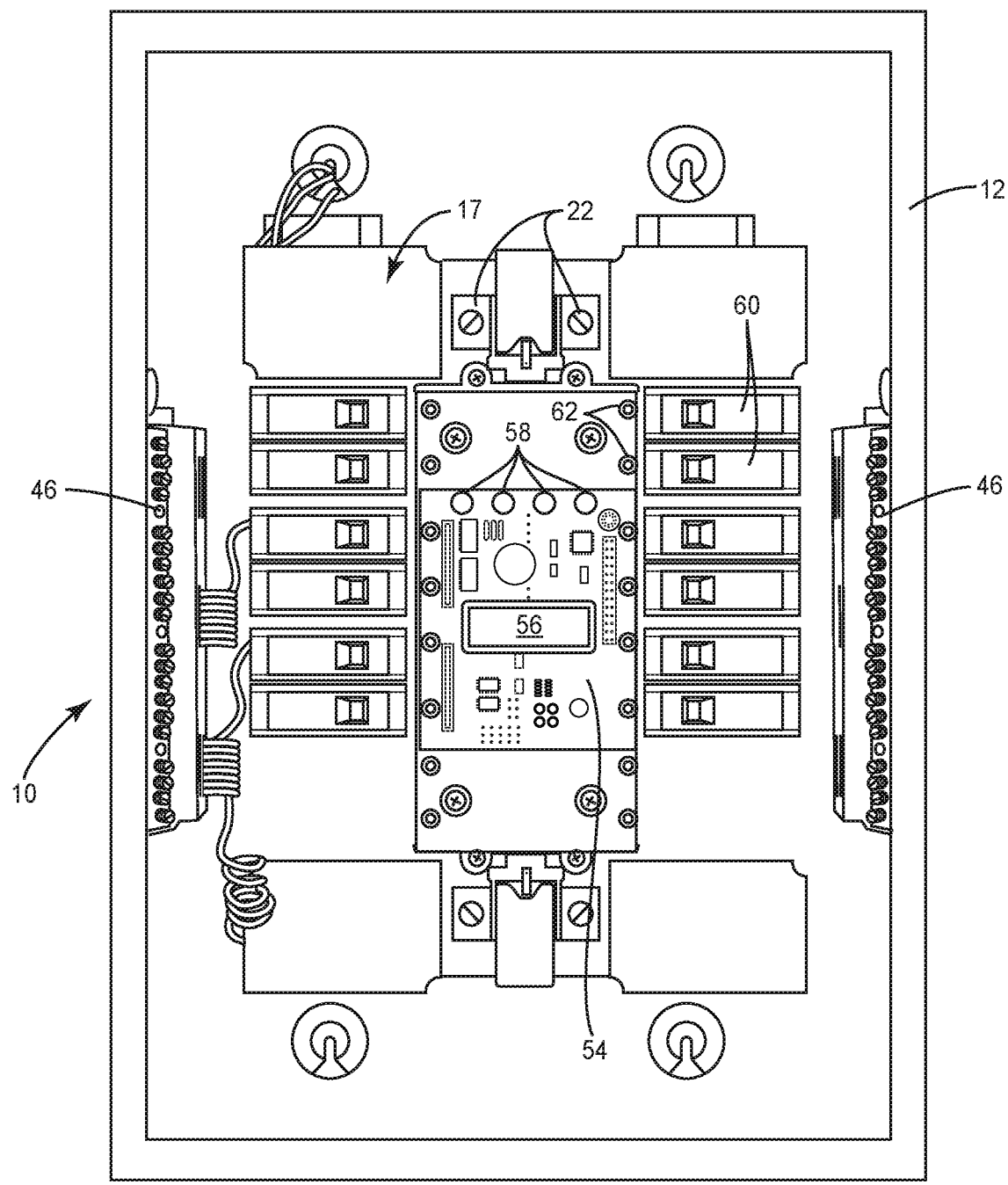
FIG. 9 is a view of the smart load center panel with all component installed (but without wiring connected).

FIG. 9 depicts a more fully assembled smart load center panel 10. The power lugs 22 at the top and bottom are available to be connected to the L1 and L2 hot legs of different power sources, such as grid and solar. The neutral bars 46 are available at each side to connect the return current neutral wires. A processor PCB 54 is mounted over the chassis 16, with connections to each individual circuit board 28, and single-pole breakers 60 have been installed over the breaker stabs 26, and in the cross channels 18 in the chassis 16. A display 56, such as for example a liquid crystal display (LCD) is visible on the processor PCB 54. The PCB 54 contains a microprocessor, memory, a real-time clock, interface circuits, and the like, as known in the art. In one embodiment, four push buttons 58 are provided for selecting among functions programmed into the processor 56. In other embodiments, communication with the microprocessor 56 may be provided via a wired or wireless link. In one embodiment, a Light Emitting Diode (LED) 62 is associated with each breaker 60, indicating the status of the breaker and/or which power source is currently connected to that breaker 60. A power supply for the processor PCB 54 is disposed in the upper left compartment 17 of the chassis 16.

Figure 10:
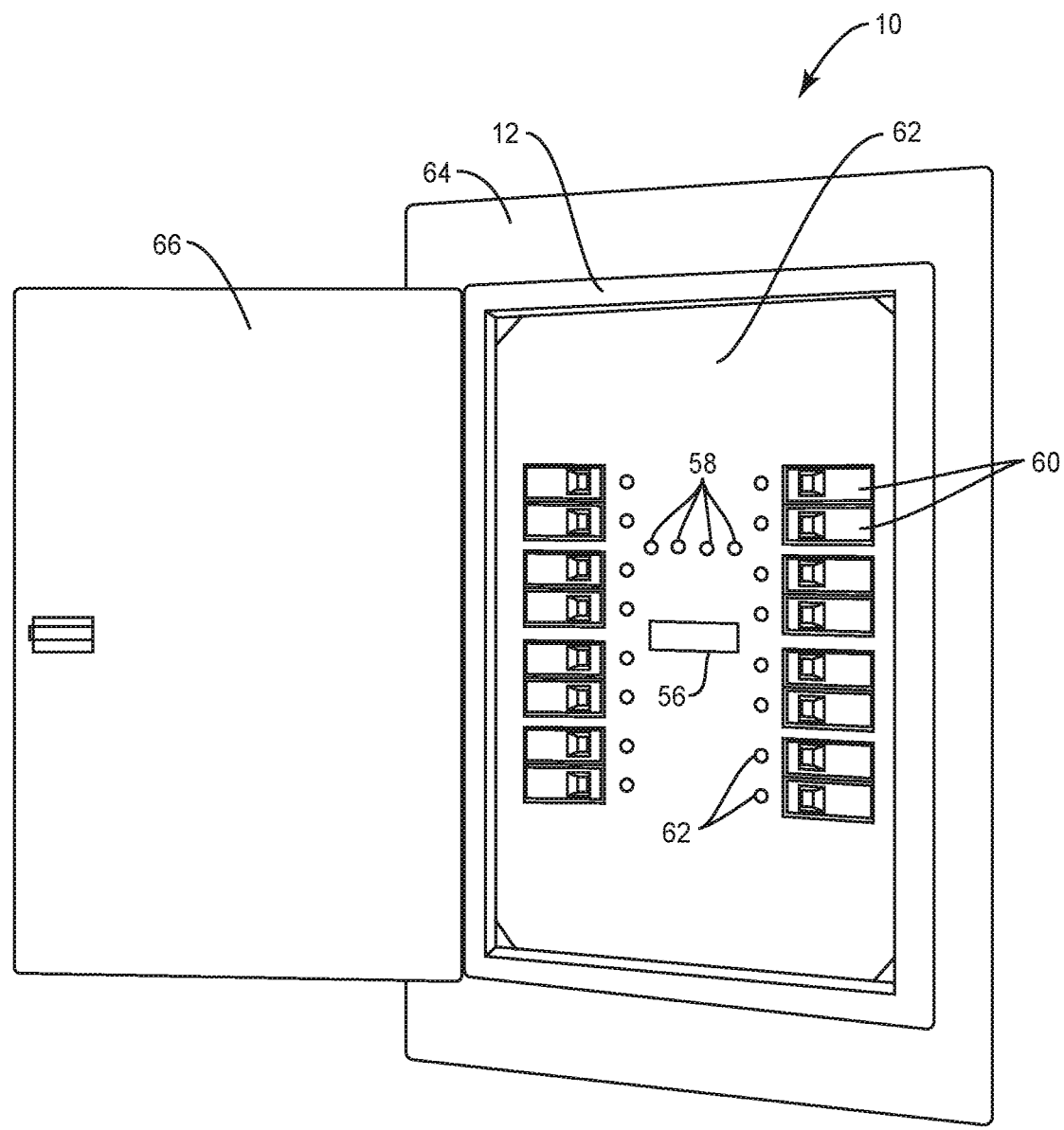
FIG. 10 is a view of a complete smart load center panel installed in a wall.

FIG. 10 depicts the fully assembled and installed smart load center panel 10. The housing 12 is mounted between the studs of a wall. A cover 62 covers the components in the housing 12, with cut-outs for the breakers 60, LEDs 62, and display 56. A front panel 64, including a door 66, is mounted over the housing 12, which covers the hole formed in the wall surface (tile, in the example depicted in FIG. 10).

The components and construction of the smart load center panel 10 present numerous advantages over breaker panels of the prior art. A bus bar assembly 20 distributes four hot legs of power to the breakers, while insulating the bars from inadvertent contact and the concomitant shock hazard. By forming a plurality of individual circuit boards 28 from a master PCB 40, placement, mounting, and soldering of the individual circuit boards 28 is greatly simplified. Cutting the edges of the master PCB 40 to yield individual circuit boards improves the electrical isolation between circuits. Mounting breaker stabs 26 to circuit boards 28 allows easy electrical connection to an intervening relay 24, as well as control lines and other circuits. A dielectric chassis 16 provides physically and electrically isolated channels for the circuit boards 28, the bus bar assembly 20, and the breakers 60, as well as providing compartments 17 for optional circuits, such as a power supply for the processor PCB 54. Placing the neutral and ground buses 46, 52 at the sides of the housing 12, behind the front panel flange, makes optimal use of space within the housing 12. Mounting the processor PCB 54 on the top presents the display 56, push buttons 58, and LEDs 62—as well as switches on the breakers 60—to a user in the finished, installed panel 10.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A smart load center panel operative to dynamically distribute power from two sources selectively and individually to a plurality of circuits, comprising:
   a housing operative to fit in a wood frame construction wall and having a back wall and four side walls;
   a dielectric chassis defining a plurality of cross channels operative to hold and electrically isolate individual circuit boards from the housing and also defining a central longitudinal channel operative to hold a bus bar assembly, the chassis being secured to the back wall of the housing;
   a bus bar assembly disposed in the longitudinal channel and comprising a plurality of bus bars, each connected to one power leg of each power source, and a dielectric sheath insulating the bus bars from each other and from inadvertent contact; and
   a plurality of individual circuit boards, each electrically connected to a bus bar carrying a corresponding power leg of each power source, and having two breaker stabs and two relays installed thereon, each relay operative to selectively electrically connect a breaker stab to one of the two power sources under the control of a processor.

2. The panel of claim 1, wherein the cross channels in the chassis are formed by a plurality of pairs of ribs integral to the chassis, the cross channels arranged in rows transverse to the central longitudinal channel.

3. The panel of claim 2, wherein the central longitudinal channel is defined by a space between the ribs of each pair.

4. The panel of claim 1, wherein the bus bar assembly comprises four bus bars, each carrying current for one of two power legs of each of two power sources.

5. The panel of claim 4, wherein the bus bars are arranged in the bus bar assembly such that a power leg of one power source is adjacent the corresponding power leg of the other power source.

6. The panel of claim 5, wherein each bus bar includes stubs at predetermined spacing along its length, each stub corresponding to a via in a circuit board connecting that bus bar to a relay input.

7. The panel of claim 6, wherein the stubs for the four bus bars are staggered along their lengths.

8. The panel of claim 1, further comprising one or more compartments formed in the chassis, and operative to hold an electronic circuit.

9. The panel of claim 1, wherein each circuit board is disposed within a cross channel, spans the central channel, and has two relays installed thereon, each relay interposed between the two bus bar connections and an associated breaker stab.

10. The panel of claim 9, wherein each circuit board further has two current sensors installed thereon, each current sensor operative to monitor current flow from a selected bus bar to a circuit breaker connected to an associated breaker stab.

11. The panel of claim 9, wherein a pair of ribs physically and electrically separates each circuit board from an adjacent circuit board.

12. The panel of claim 9, wherein the circuit boards are grouped into pairs, whereby one circuit board of the pair is connected to corresponding hot legs of both power sources, and the other circuit board of the pair is connected to opposite, corresponding hot legs of both power sources.

13. The panel of claim 12, wherein the circuit boards of each pair are separated by a first spacing, and wherein pairs of circuit boards are separated by second, larger spacing.

14. The panel of claim 12, wherein, if both power sources are 3-wire, single-phase, mid-point neutral, the two breaker stabs at either side of a pair of circuit boards, if the relays are controlled to connect each to the same power source, each provides a nominal voltage respect to neutral and the two have opposite phase, or they provide double the nominal voltage across them.

15. The panel of claim 1, wherein the housing includes a flange around a front opening, and wherein one or both of a ground and neutral bar are mounted behind the flange.

16. The panel of claim 15, wherein a neutral bus bar is mounted behind the flange and insulated from the housing by a dielectric mounting block.

17. The panel of claim 16, wherein the neutral bar comprises a longitudinal conductive strip having a plurality of holes formed therein and operative to accept corresponding neutral wires, and further comprising a set screw operative to secure a wire in a corresponding hole, the set screws being angled at approximately 45° to the back wall and corresponding side wall of the housing.

18. The panel of claim 15, wherein a ground bus bar is mounted behind the flange and directly to the housing.

19. The panel of claim 1, further comprising a processor board mounted to the chassis and connected to each circuit board, the processor board having a processor and memory mounted thereon whereby the processor is operative to control the relays on each circuit board to connect the breaker stabs to the desired power source.

20. The panel of claim 19, further comprising a user interface mounted to the processor board.

21. The panel of claim 20, wherein the user interface comprises a display.

22. The panel of claim 20, wherein the user interface comprises one or more pushbuttons for user input.

23. A method of fabricating and mounting a plurality of individual circuit boards in a smart load center panel operative to dynamically distribute power from two sources selectively and individually to a plurality of circuits and comprising a housing operative to fit in a wood frame construction wall and having a back wall and four side walls; a dielectric chassis defining a plurality of cross channels and a central longitudinal channel, the chassis secured to the back wall of the housing; a bus bar assembly disposed in the longitudinal channel and comprising a plurality of bus bars, each connected to one power leg of each power source, and a dielectric sheath insulating the bus bars from each other and from inadvertent contact, the method steps comprising:
   fabricating a master printed circuit board, PCB, having a longitudinal axis and including a plurality of slits formed in the PCB transverse to the longitudinal axis, the slits extending through the center of the PCB but not to the edges thereof, wherein all conductive paths, vias, and mounting holes for each of the plurality of individual circuit boards are located between slits;
   mounting the master PCB to the chassis; and after mounting the master PCB to the chassis, cutting the master PCB in a longitudinal direction near each edge thereof but inwardly of the furthest extent of the plurality of slits, thereby resulting in the plurality of individual circuit boards being mounted to the chassis in a spaced apart relationship; and installing at least one breaker stab and relay on each individual circuit board, whereby the relay is operative to selectively electrically connect the breaker stab to one of the two power sources under the control of a processor.

24. The method of claim 23, wherein mounting the master PCB to the chassis comprises attaching the master PCB to the chassis with at least one fastener between each slit, such that each individual circuit board is secured to the chassis after cutting off the master PCB edges.

25. The method of claim 23, wherein mounting the master PCB to the chassis comprises soldering two stubs protruding from the bus bar assembly to corresponding vias in the master PCB between each slit, such that each individual circuit board is soldered to two stubs of the bus bar assembly after cutting off the master PCB edges.

26. The method of claim 23, wherein:
the individual circuit boards are grouped into pairs, wherein the circuit boards of each pair are separated by a first spacing, and wherein pairs of circuit boards are separated by second, larger spacing;
one of the plurality of slits is disposed between adjacent individual circuit boards of each pair; and
two of the plurality of slits are disposed between pairs of individual circuit boards;
whereby when the master PCB edges are cut off,
the width of the slits disposed between adjacent individual circuit boards defines the spacing between the individual circuit boards of each pair, and
the widths of the slits disposed between pairs of individual circuit boards, and the width of master PCB material between the slits, defines the spacing between the pairs.

* * * * *